(12) United States Patent
Kolluri et al.

(10) Patent No.: US 11,679,497 B2
(45) Date of Patent: Jun. 20, 2023

(54) DISTRIBUTED ROBOTIC DEMONSTRATION LEARNING

(71) Applicant: Intrinsic Innovation LLC, Mountain View, CA (US)

(72) Inventors: Bala Venkata Sai Ravi Krishna Kolluri, Fremont, CA (US); Stefan Schaal, Mountain View, CA (US); Benjamin M. Davis, Oakland, CA (US); Ralf Oliver Michael Schönherr, San Francisco, CA (US); Ning Ye, Palo Alto, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 280 days.

(21) Appl. No.: 16/880,724

(22) Filed: May 21, 2020

(65) Prior Publication Data
US 2021/0362327 A1 Nov. 25, 2021

(51) Int. Cl.
B25J 9/16 (2006.01)
(52) U.S. Cl.
CPC ............ B25J 9/163 (2013.01); B25J 9/161 (2013.01); B25J 9/1656 (2013.01); B25J 9/1689 (2013.01)
(58) Field of Classification Search
CPC . B25J 9/163; B25J 9/161; B25J 9/1656; B25J 9/1689; B25J 9/1661; G05B 19/423; G05B 2219/39546; G05B 2219/36442; G05B 2219/40116; G05B 2219/40391
See application file for complete search history.

(56) References Cited

U.S. PATENT DOCUMENTS

| | | | |
|---|---|---|---|
| 9,008,840 B1 | 4/2015 | Ponulak et al. | |
| 10,279,476 B2 | 5/2019 | Jaekel et al. | |
| 10,369,694 B2 | 8/2019 | Laurent et al. | |
| 10,545,497 B1 * | 1/2020 | Cui ..................... | G05D 1/0016 |

(Continued)

FOREIGN PATENT DOCUMENTS

| WO | WO 2016/036593 | 3/2016 |
|---|---|---|
| WO | WO 2020/047120 | 3/2020 |

OTHER PUBLICATIONS

Archibald et al., "Model for skills-oriented robot programming (SKORP)," Proceedings of SPIE, Mar. 1993, 1964:392-402.

(Continued)

*Primary Examiner* — Nicholas Kiswanto
*Assistant Examiner* — Danielle Marie Jackson
(74) *Attorney, Agent, or Firm* — Fish & Richardson P.C.

(57) ABSTRACT

Methods, systems, and apparatus, including computer programs encoded on computer storage media, for distributed robotic demonstration learning. One of the methods includes receiving a skill template to be trained to cause a robot to perform a particular skill having a plurality of subtasks. One or more demonstration subtasks defined by the skill template are identified, wherein each demonstration subtask is an action to be refined using local demonstration data. On online execution system uploads sets of local demonstration data to a cloud-based training system. The cloud-based training system generates respective trained model parameters for each set of local demonstration data. The skill template is executed on the robot using the trained model parameters generated by the cloud-based training system.

23 Claims, 12 Drawing Sheets

(56) References Cited

U.S. PATENT DOCUMENTS

| | | | |
|---|---|---|---|
| 10,668,619 B2 | 6/2020 | Ueda et al. | |
| 10,807,235 B2 | 10/2020 | Tsuda et al. | |
| 11,052,541 B1* | 7/2021 | Howard | G05D 1/0061 |
| 2017/0001309 A1 | 1/2017 | Passot et al. | |
| 2019/0202053 A1* | 7/2019 | Tan | B25J 9/161 |
| 2019/0228309 A1 | 7/2019 | Yu et al. | |
| 2020/0070343 A1 | 3/2020 | Thomaz et al. | |
| 2020/0210901 A1* | 7/2020 | Zhang | G05B 19/4155 |
| 2021/0229291 A1* | 7/2021 | Yang | B25J 9/1697 |
| 2021/0316448 A1* | 10/2021 | Husain | B25J 9/1697 |
| 2021/0362330 A1 | 11/2021 | Kolluri et al. | |
| 2021/0362331 A1 | 11/2021 | Kolluri et al. | |
| 2021/0379758 A1 | 12/2021 | Chu et al. | |
| 2022/0048186 A1* | 2/2022 | Sharma | G06Q 50/28 |

OTHER PUBLICATIONS

Hussein et al., "Deep imitation learning for 3D navigation tasks," Neural Comput & Applic., Dec. 2017, 29(7):389-404.
International Search Report and Written Opinion in International Appln. No. PCT/US2021/032741, dated Aug. 31, 2021, 16 pages.
Metzen et al., "Towards Learning of Generic Skills for Robotic Manipulation," Kunstl Intell, Dec. 2013, 28(1):15-20.
Wahrburg et al., "Combined pose-wrench and state machine representation for modeling Robotic Assembly Skills," 2015 IEEE/RSJ International Conference on Intelligent Robots and Systems, Sep. 2015, pp. 852-857.
International Search Report and Written Opinion in International Appln. No. PCT/US2021/032736, dated Aug. 30, 2021, 16 pages.
U.S. Appl. No. 16/880,860, Kolluri et al., Skill Template Distribution for Robotic Demonstration Learning, filed May 21, 2020, 67 pages.

* cited by examiner

DISTRIBUTED ROBOTIC DEMONSTRATION LEARNING

BACKGROUND

This specification relates to robotics, and more particularly to planning robotic movements.

Robotics control refers to controlling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a schedule that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

Some research has been conducted toward using machine learning control algorithms, e.g., reinforcement learning, to control robots to perform particular tasks. However, robots have a number of drawbacks that make traditional learning approaches generally unsatisfactory.

First, robots naturally have a very complex, high-dimensional, and continuous action space. Thus, it is computationally expensive to generate and evaluate all possible candidate actions. Secondly, robotic control is an environment with extremely sparse rewards because most possible actions do not result in completing a particular task. A technique known as reward shaping has been employed to mitigate the sparse reward problem, but it is generally not scalable for hand-designed reward functions.

An additional complication is that traditional techniques for using robotic learning for robotic control are extremely brittle. This means that even if a workable model is successfully trained, even very tiny changes to the task, the robot, or the environment can cause the entire model to become completely unusable.

All of these problems mean that traditional ways of using techniques such as reinforcement learning for robotic control result in a computationally expensive process that is difficult to get working at all, which doesn't scale well, and which doesn't generalize to other situations.

SUMMARY

This specification describes technologies relating to demonstration-based robotic learning. In particular, the specification describes how a robot can be programmed to perform a robotic task using a customized control policy learned using a skill template and demonstration data.

In this specification, a task refers to a capability of a particular robot that involves performing one or more subtasks. For example, a connector insertion task is a capability that enables a robot to insert a wire connector into a socket. This task typically includes two subtasks: 1) move a tool of a robot to a location of the socket, and 2) insert the connector into the socket at the particular location.

In this specification, a subtask is an operation to be performed by a robot using a tool. For brevity, when a robot has only one tool, a subtask can be described as an operation to be performed by the robot as a whole. Example subtasks include welding, glue dispensing, part positioning, and surface sanding, to name just a few examples. Subtasks are generally associated with a type that indicates the tool required to perform the subtask, as well as a location within a coordinate system of a workcell at which the subtask will be performed.

In this specification, a skill template, or for brevity, a template, is a collection of data and software that allows a robot to be tuned to perform a particular task. The skill template data represents one or more subtasks required to perform the task as well as information describing which subtasks of the skill require local demonstration learning and which perceptual streams will be needed to determine success or failure. Thus, a skill template can define demonstration subtasks that require local demonstration learning, non-demonstration subtasks that do not require local demonstration learning, or both.

These technologies are particularly advantageous for robot tasks that are traditionally difficult to control using machine learning, e.g., reinforcement learning. These tasks include those involving physical contact with objects in a work space, for example, sanding, connection and insertion tasks, and wire routing, to name just a few examples.

Particular embodiments of the subject matter described in this specification can be implemented so as to realize one or more of the following advantages. Learning using demonstration data as described in this specification solves the sparse reward and inability to generalize problems of traditional reinforcement learning methods.

The system can use visual, proprioceptive (joint) data, haptic data, and any other features to perform tasks, which allows the system to adapt rapidly to particular robot models with high precision. The emphasis is on "sensor-rich robot manipulation", in contrast to the classical view of minimal sensing in robotics. This in general means that cheaper robots can be used to do the same tasks with less setup time.

The techniques described below allow machine learning techniques to be rapidly adapted to any appropriate robot having the appropriately installed hardware abstractions. In a typical scenario, a single non-expert person can train a robot to execute a skill template in less than one day of setup time. This is a vast improvement over traditional methods, which can require teams of experts to work on the problem for weeks designing a reward function and requires weeks of training time on very large data-centers. This effectively allows machine-learned robotic control to be distributed widely to many types of robots and even robots that the system has never seen before.

These techniques can effectively implement robotic learning as a service, which results in greater access to the technology. This in turn makes the entire robotic industry safer and more efficient overall.

The combination of reinforcement learning, perceptual data processing with machine learning, and advanced impedance/admittance control will enable robotic skill that, despite the task complexity, will perform at very high rates of success, as required in industrial applications.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
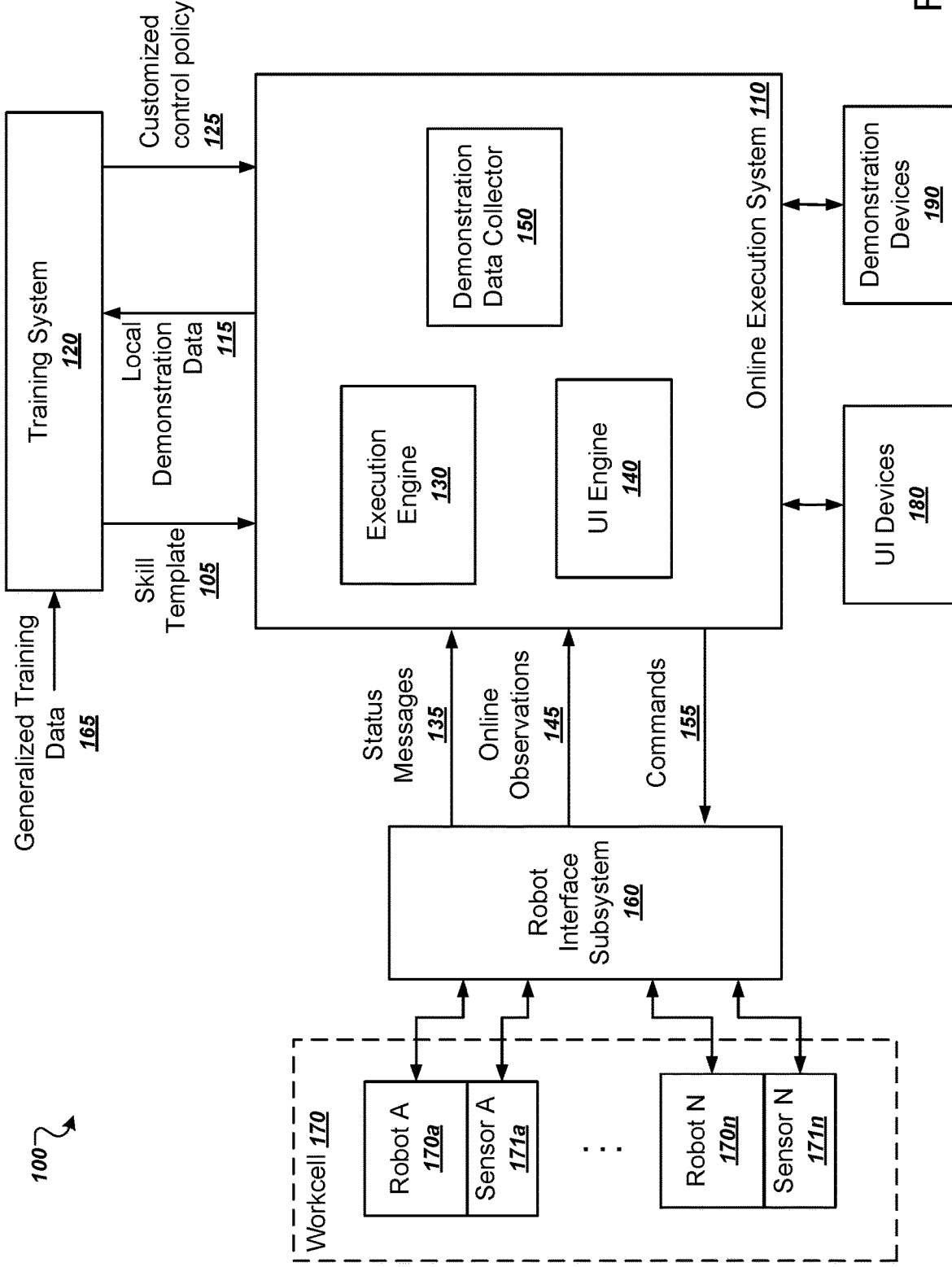
FIG. 1 is a diagram of an example demonstration learning system.

FIG. 1 is a diagram of an example demonstration learning system. The system 100 is an example of a system that can implement the demonstration-based learning techniques described in this specification.

The system 100 includes a number of functional components, including an online execution system 110, a training system 120, and a robot interface subsystem 160. Each of these components can be implemented as computer programs installed on one or more computers in one or more locations that are coupled to each other through any appropriate communications network, e.g., an intranet or the Internet, or combination of networks.

The system 100 operates to control the robots 170a-n in two basic modes: a demonstration mode and an execution mode.

In demonstration mode, a user can control one or more robots 170a-n to perform a particular task or subtask. While doing so, the online execution system 110 collects status messages 135 and online observations 145 to generate local demonstration data. A demonstration data collector 150 is a module that can generate local demonstration data 115 from the status messages 135 and online observations 145, which the online execution system 110 can then provide to the training system 120. The training system can then generate a customized control policy 125 that is specific to the particular characteristics of both the task and the robot performing the task.

In this specification, a control policy is a module or a subsystem that generates one or more next actions for a robot to perform for a given observational input. The output of a control policy can affect movements to one or more robotic components, e.g., motors or actuators, either as commands directly output by the policy, or as higher-level commands that are each consumed by multiple robot components through the mechanisms of the robot control stack.

A control policy can thus include one or more machine learning models that translate an environmental observation into one or more actions.

In this specification, local demonstration data is data gathered while a user is controlling a robot to demonstrate how the robot can perform a particular task by causing the robot to perform physical movements. Local demonstration data can include kinematics data, e.g., joint positions, orientations, and angles. Local demonstration data can also include sensor data, e.g., data gathered from one or more sensors. The sensors can include force sensors; visual sensors, e.g., camera, depth cameras, and lidar; electrical connection sensors; acceleration sensors; audio sensors; gyros; contact sensors; radar sensors; and proximity sensors, e.g., infrared proximity sensors, capacitive proximity sensors, or inductive proximity sensors, to name just a few examples.

Typically the local demonstration data is obtained from one or more robots that are in close proximity to the user controlling the robot in demonstration mode. However, close physical proximity between a user and a robot is not a requirement to obtain local demonstration data. For example, a user can obtain local demonstration data remotely from a particular robot through a remote user interface.

The training system 120 is a computer system that can use machine learning techniques to generate a customized control policy 125 from the local demonstration data 115. The training system 120 typically has vastly more computing resources than the online execution system 110. For example, the training system 120 can be a cloud-based computing system having hundreds or thousands of computing nodes.

To generate the customized control policy 125, the training system 120 can first obtain or pregenerate a base control policy for the task. The base control policy is a control policy that is expected to work well enough for a particular task to cause any sufficiently similar robot to be relatively close to being able to perform the task. For the vast majority of tasks, the base control policy alone is not expected to be sufficiently precise to achieve the task with sufficiently reliable success. For example, connection and insertion tasks typically require sub-millimeter precision, which is precision that cannot be obtained without the specifics provided by local demonstration data for a particular robot.

The base control policy for a particular task can be generated in a variety of ways. For example, the base control policy can be manually programmed, trained using traditional reinforcement learning techniques, or using the demonstration-based learning techniques described in this specification. All of these techniques can be suitable for pregenerating a base control policy before receiving local demonstration data for a task because time is less of a consideration when generating the base control policy.

In some implementations, the training system generates the base control policy from generalized training data 165. While the local demonstration data 115 collected by the online execution system 110 is typically specific to one particular robot or one particular robot model, the generalized training data 165 can in contrast be generated from one or more other robots, which need not be the same model, located at the same site, or built by the same manufacturer. For example, the generalized training data 165 can be generated offsite from tens or hundreds or thousands of different robots having different characteristics and being different models. In addition, the generalized training data 165 does not even need to be generated from physical robots. For example, the generalized training data can include data generated from simulations of physical robots.

Thus, the local demonstration data 115 is local in the sense that it is specific to a particular robot that a user can access and manipulate. The local demonstration data 115 thus represents data that is specific to a particular robot, but can also represent local variables, e.g., specific characteristics of the particular task as well as specific characteristics of the particular working environment.

The base control policy can also be defined using system demonstration data that is collected during the process of developing the skill template. For example, a team of engineers associated with the entity that generates skill templates can perform demonstrations using one or more robots at a facility that is remote from and/or unassociated with the system 100. The robots used to generate the system demonstration data also need not be the same robots or the same robot models as the robots 170a-n in the workcell 170. In this case, the system demonstration data can be used to bootstrap the actions of the base control policy. The base control policy can then be adapted into a customized control policy using more computationally expensive and sophisticated learning methods.

Adapting a base control policy using local demonstration data has the highly desirable effect that it is relatively fast compared to generating the base control policy, e.g., either by collecting system demonstration data or by training using the generalized training data 165. For example, the size of the generalized training data 165 for a particular task tends to be orders of magnitude larger than the local demonstration data 115 and thus training the base control policy is expected to take much longer than adapting it for a particular robot. For example, training the base control policy can require vast computing resources, in some instances, a datacenter having hundreds or thousands of machines working for days or weeks to train the base control policy from generalized training data. In contrast, adapting the base control policy using local demonstration data 115 can take just a few hours.

Similarly, collecting system demonstration data to define the base control policy can require many more iterations than are required for the local demonstration data. For example, to define a base control policy, a team of engineers can demonstration 1000 successful tasks and 1000 unsuccessful tasks. In contrast, sufficiently adapting the resulting base control policy might require only 50 successful demonstrations and 50 unsuccessful demonstrations.

The training system 120 can thus refine a base control policy using the local demonstration data 115 in order to generate the customized control policy 125 for the particular robot that was used to generate the demonstration data. The customized control policy 125 adjusts the base control policy to account for characteristics of the particular robot as well as local variables for the task. Training the customized control policy 125 using local demonstration data can take far less time than training the base control policy. For example, while training the base control policy can take many days or weeks, a user might spend just 1-2 hours with a robot to generate the local demonstration data 115, which can then be uploaded to the training system 120. The training system 120 can then generate the customized control policy 125 in much less time than the time it took to train the base control policy, e.g., perhaps just an hour or two.

In execution mode, an execution engine 130 can use the customized control policy 125 to automatically perform the task without any user intervention. The online execution system 110 can use the customized control policy 125 to generate commands 155 to be provided to the robot interface subsystem 160, which drives one or more robots, e.g., robots 170a-n, in a workcell 170. The online execution system 110 can consume status messages 135 generated by the robots 170a-n and online observations 145 made by one or more sensors 171a-n making observations within the workcell 170. As illustrated in FIG. 1, each sensor 171 is coupled to a respective robot 170. However, the sensors need not have a one-to-one correspondence with robots and need not be coupled to the robots. In fact, each robot can have multiple sensors, and the sensors can be mounted on stationary or movable surfaces in the workcell 170.

The execution engine 130 can use the status messages 135 and online observations 145 as input to the customized control policy 125 received from the training system 120. Thus, the robots 170a-n can react in real time to complete the task according to their particular characteristics and the particular characteristics of the task.

Thus, using local demonstration data to adjust a control policy results in a vastly different user experience. From the user's perspective, training a robot to perform a task very precisely with a customized control policy, including generating the local demonstration data and waiting for the customized control policy to be generated, is a very quick process that can take under a day of setup time. The speed comes from leveraging the precomputed base control policy.

This arrangement introduces a vast technological improvement over existing robotic learning methods, which usually require weeks of testing and generating a hand-designed reward functions, weeks of generating suitable training data, and weeks more of training, testing, and refining the models so that they are suitable for industrial production.

In addition, unlike traditional robotic reinforcement learning, using local demonstration data is highly robust to small perturbations in the characteristics of the robot, the task, and the environment. If a company purchases a new robot model, a user simply needs to spend a day generating new local demonstration data for a new customized control policy. This is in contrast to existing reinforcement learning methods in which any change to the physical characteristics of the robot, the task, or the environment may require starting the entire weeks-long process over from scratch.

To initiate the demonstration-based learning process, the online execution system can receive a skill template 105 from the training system 120. As described above, the skill template 105 can specify a sequence of one or more subtasks required to perform a skill, which of the subtasks require local demonstration learning, and which perceptual streams will be needed for which subtasks, as well as transition conditions that specify when to transition from performing one subtask of the skill template to the next.

As described above, a skill template can define demonstration subtasks that require local demonstration learning, nondemonstration subtasks that do not require local demonstration learning, or both.

Demonstration subtasks are implicitly or explicitly tied to a base control policy, which can be precomputed from generalized training data or system demonstration data, as described above. Thus, a skill template can include a separate base control policy, or an identifier of a base control policy, for each demonstration subtask in the template.

A skill template can also include, for each demonstration subtask, the software modules that are required to tune the demonstration subtask using local demonstration data. Each demonstration subtask can rely on a different type of machine learning model and can use different techniques for tuning. For example, a movement demonstration subtask can rely heavily on camera images of the local workcell environment in order to find a particular task goal. Thus, the tuning procedure for the movement demonstration subtask can more heavily tune the machine learning models to recognize features in camera images captured in the local demonstration data. In contrast, an insertion demonstration subtask can rely heavily on force feedback data for sensing the edges of a connection socket and using appropriately gentle forces to insert a connector into the socket. Therefore, the tuning procedure for the insertion demonstration subtask can more heavily tune the machine learning models that deal with force perception and corresponding feedback. In other words, even when the underlying models for subtasks in a skill template are the same, each subtask can have its own respective tuning procedures for incorporating local demonstration data in differing ways.

Nondemonstration subtasks may or may not be associated with a base control policy. For example, a nondemonstration subtask can simply specify moving to a particular coordinate location. Alternatively, a nondemonstration subtask can be associated with a base control policy, e.g., as computed from other robots, that specifies how the joints should move to a particular coordinate location using sensor data.

The purpose of a skill template is to provide a generalized framework for programming a robot to have a particular task capability. In particular, the skill template can be used to adapt a robot to perform similar tasks with relatively little effort. Adapting a skill template for a particular robot and a particular environment thus involves performing a training process for each demonstration subtask in the skill template. For brevity, this process may be referred to as training the skill template, even though multiple, separately trained models may be involved.

For example, a user can download a connector insertion skill template that specifies performing a first movement subtask followed by a connector insertion subtask. The connector insertion skill template can also specify that the first subtask relies on a visual perceptual stream, e.g., from a camera, but that the second subtask relies on a force perceptual stream, e.g., from a force sensor. The connector insertion skill template can also specify that only the second subtask requires local demonstration learning. This can be because moving a robot to a particular location is usually not highly dependent on the circumstances of the task at hand or on the working environment. However, if the working environment has tight space requirements, the template may also specify that the first subtask requires local demonstration learning so that the robot can quickly learn to navigate through the tight space requirements of the working environment.

To equip the robot with the connector insertion skill, a user merely needs to guide the robot in performing the subtasks that are indicated by the skill template as requiring local demonstration data. The robot will automatically capture the local demonstration data, which the training system can use to refine a base control policy associated with the connector insertion subtask. When training of the customized control policy is complete, the robot merely needs to download the final trained customized control policy in order to be equipped to perform the subtask.

Notably, the same skill template can be used for many different kinds of tasks. For example, the same connector insertion skill template can be used to equip a robot to perform HDMI cable insertions or USB cable insertions or both. All that is required is for a user to demonstrate these different insertion subtasks in order to refine the base control policy for the demonstration subtask being learned. As described above, typically this process takes far less computing power and far less time than developing or learning a complete control policy from scratch.

In addition, the skill template approach can be hardware agnostic. This means that a skill template can be used to equip a robot to perform a task even when the training system has never trained a control policy for that particular robot model. This technique thus solves many of the problems with using reinforcement learning to control robots. In particular, it solves the brittleness problem in which even very small hardware changes require re-learning a control policy from scratch, which is expensive and duplicative effort.

To support collecting local demonstration data, the system 100 can also include one or more UI devices 180 and one or more demonstration devices 190. The UI devices 180 can help guide a user in obtaining local demonstration data that will be most beneficial in generating the customized control policy 125. The UI devices 180 can include user interfaces that instruct the user on what kinds of actions to perform or repeat, as well as augmented-reality devices that allow a user to control a robot without being physically next to the robot.

The demonstration devices 190 are devices that are auxiliary to the primary operation of the system 100. Generally, the demonstration devices 190 are devices that allow a user to demonstrate a skill to a robot without introducing extraneous force data into the local demonstration data. In other words, the demonstration devices 190 can reduce the possibility that the user's demonstration action affect what the force sensors would actually read during execution.

In operation, the robot interface subsystem 160 and the online execution system 110 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The online execution system 110, on the other hand, typically has more flexibility in operation. In other words, the online execution system 110 may, but need not, provide a command 155 within every real-time time window under which the robot interface subsystem 160 operates. However, in order to provide the ability to make sensor-based reactions, the online execution system 110 may still operate under strict timing requirements. In a typical system, the real-time requirements of the robot interface subsystem 160 require that the robots provide a command every 5 milliseconds, while the online requirements of the online execution system 110 specify that the online execution system 110 should provide a command 155 to the robot interface subsystem 160 every 20 milliseconds. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met. In some implementations, the robot interface subsystem 160 provides a hardware-agnostic interface so that the commands 155 issued by onsite execution engine 150 are compatible with multiple different versions of robots. During execution, the robot interface subsystem 160 can report status messages 135 back to the online execution system 110 so that the online execution system 150 can make online adjustments to the robot movements, e.g., due to local faults or other unanticipated conditions. The robots can be real-time robots, which means that the robots are programmed to continually execute their commands according to a highly constrained timeline. For example, each robot can expect a command from the robot interface subsystem 160 at a particular frequency, e.g., 100 Hz or 1 kHz. If the robot does not receive a command that is expected, the robot can enter a fault mode and stop operating.

Figure 2A:
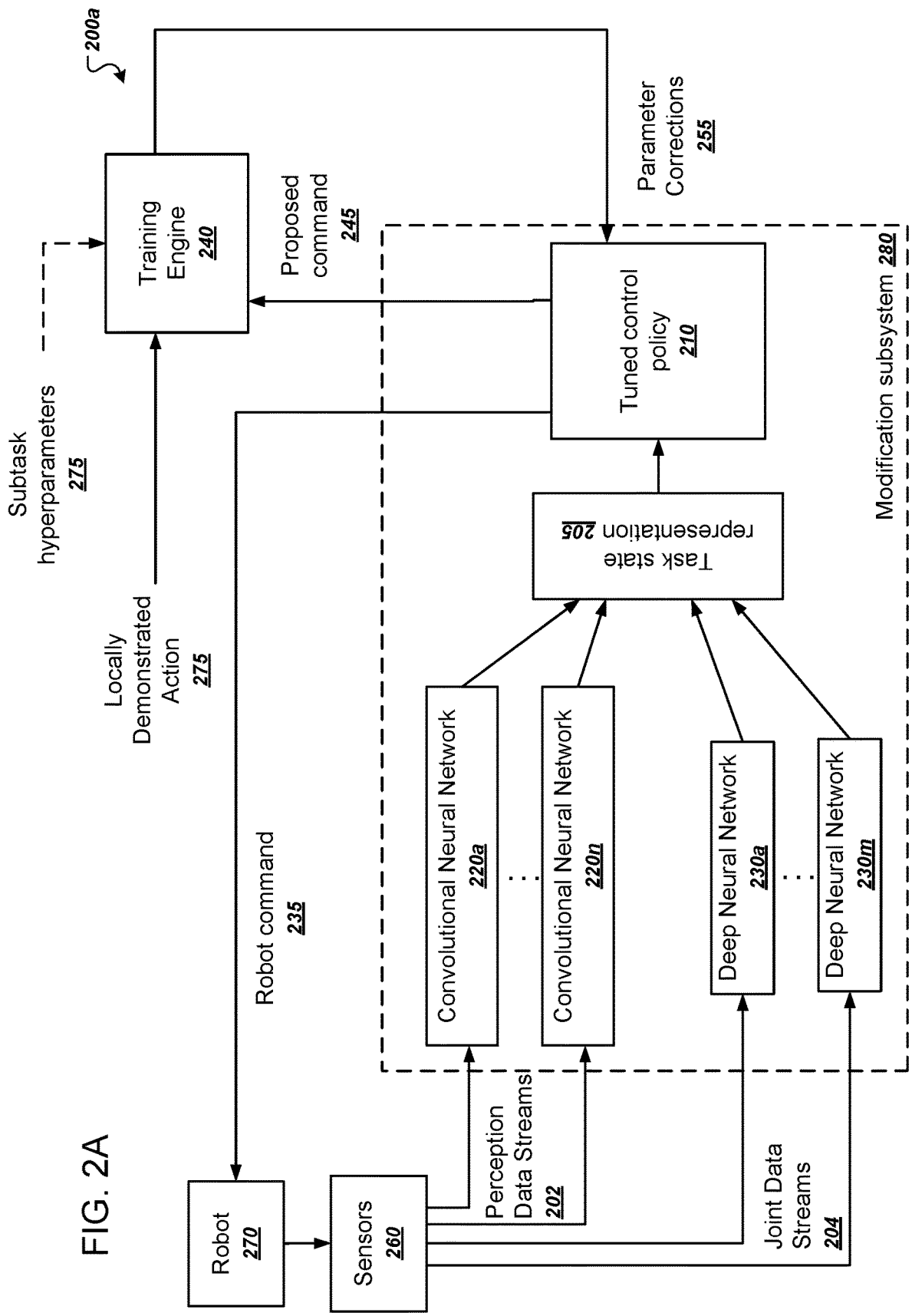
FIG. 2A is a diagram of an example system for executing a subtask using a customized control policy based on local demonstration data.

FIG. 2A is a diagram of an example system 200 for executing a subtask using a customized control policy based on local demonstration data. In general, data from multiple sensors 260 is fed through multiple, separately trained neural networks and combined into a single low-dimensional task state representation 205. The low-dimensional representation 205 is then used as an input to a tuned control policy 210, which is configured to generate a robot command 235 to be executed by a robot 270. The system 200 can thus implement a customized control policy based on local demonstration data by effectuating modifications of a base control policy through a modification subsystem 280.

The sensors 260 can include perceptual sensors that generate perception data streams that represent visual characteristics of a robot or a target in a workcell of a robot. For example, in order to achieve better vision capability, a robot tool can be equipped with multiple cameras, e.g., visible light cameras, infrared cameras, and depth cameras, to name just a few examples.

The different perception data streams 202 can be processed independently by a respective convolutional neural network 220a-n. Each perception data stream 202 can correspond to a different perceptual sensor, e.g., a different camera or a different type of camera. The data from each camera can be processed by a different respective convolutional neural network.

The sensors 260 also include one or more robot state sensors that generate robot state data streams 204 that represent physical characteristics of the robot or a component of the robot. For example, the robot state data streams 204 can represent force, torque, angles, positions, velocities, and accelerations, of the robot or respective components of the robot, to name just a few examples. Each of the robot state data streams 204 can be processed by a respective deep neural network 230a-m.

A modification subsystem 280 can have any arbitrary number of neural network subsystems processing sensor data in parallel. In some implementations, the system includes only one perceptual stream and one robot state data stream.

The outputs of the neural network subsystems are respective portions of a task state representation 205 that cumulatively represents a state of a subtask being performed by the robot 270. In some implementations, the task state representation 205 is a low-dimensional representation having fewer than 100 features, e.g., 10, 30, or 50 features. Having a low-dimensional task state representation means that there are fewer model parameters to learn, which further increases the speed at which the local demonstration data can be used to adapt a particular subtask.

The task state representation 205 is then used as input to the tuned control policy 210. During execution, the tuned control policy 210 generates, from an input task state representation 205, a robot command 235 that is then executed by the robot 270.

During training, a training engine 240 generates parameter corrections 255 by using a representation of a locally demonstrated action 275 as well as a proposed command 245 generated by the tuned control policy 210. The training engine can then use the parameter corrections 255 to refine the tuned control policy 210 so that the command generated by the tuned control policy 210 in future iterations will more closely match the locally demonstrated action 275.

In the training process, the tuned control policy 210 can be initialized with the base control policy associated with the demonstration subtask being trained. The tuned control policy 210 can be iteratively updated using locally demonstrated actions 275. The training engine 240 can use any appropriate machine learning technique for adjusting the tuned control policy 210, e.g., supervised learning, regression, or reinforcement learning. When the tuned control policy 210 is implemented using neural networks, the parameter corrections 235 can be backpropagated through the networks so that the output proposed command 245 is closer to the locally demonstrated action 275 on future iterations.

As mentioned above, each subtask of a skill template can have different training priorities, even when the architecture of their underlying models are the same or similar. Thus, in some implementations, the training engine 240 can optionally take as input subtask hyperparameters 275 that specify how to update the tuned control policy 210. For example, a subtask hyperparameter can indicate that vision sensing is very important. Thus, the training engine 240 can more aggressively correct the tuned control policy 210 to align with camera data captured with the locally demonstrated action 275. In some implementations, the subtask hyperparameters 275 identify separate training modules to be used for each different subtask.

Figure 2B:
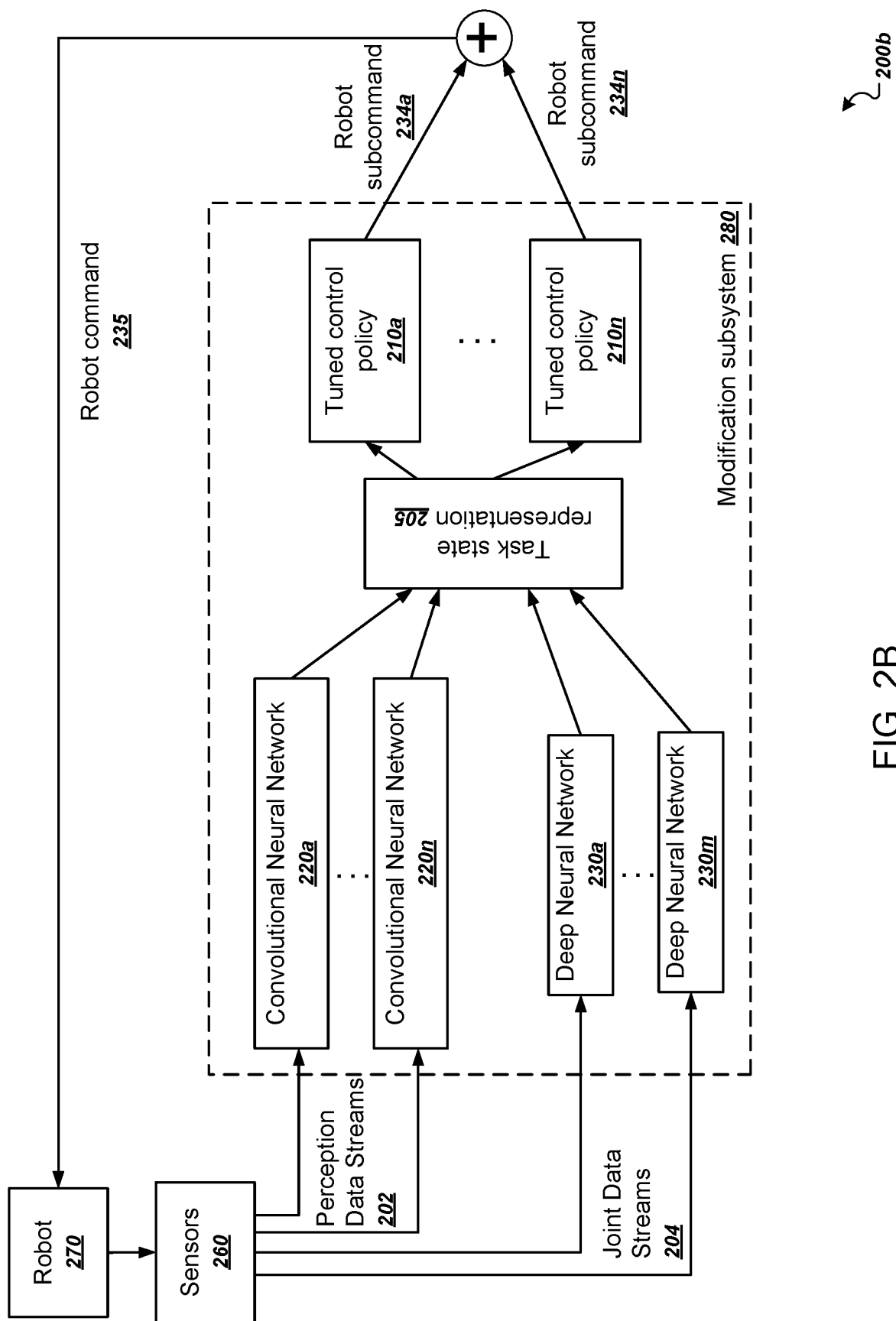
FIG. 2B is a diagram of another example system for executing a subtask using local demonstration data.

FIG. 2B is a diagram of another example system for executing a subtask using local demonstration data. In this example, instead of having only a single tuned control policy, the system includes multiple independent control policies 210a-n. Each control policy 210a-n can use the task state representation 205 to generate a respective robot subcommand 234a-n. The system can then combine the subcommands to generate a single robot command 235 to be executed by the robot 270.

Having multiple, separately tunable control policies can be advantageous in a sensor-rich environment that, for example, can use data from multiple sensors having different update rates. For example, the different control policies 210a-n can execute at different update rates, which allows the system to incorporate both simple and more sophisticated control algorithms into the same system. For example, one control policy can focus on robot commands using current force data, which can be updated at a much faster rate than image data. Meanwhile, another control policy can focus on robot commands using current image data, which may require more sophisticated image recognition algorithms, which may have nondeterministic run times. The result is a system that can both rapidly adapt to force data but also adapt to image data without slowing down its adaptations to force data. During training, the subtask hyperparameters can identify separate training procedures for each of the separately tunable control policies 210-an.

Figure 2C:
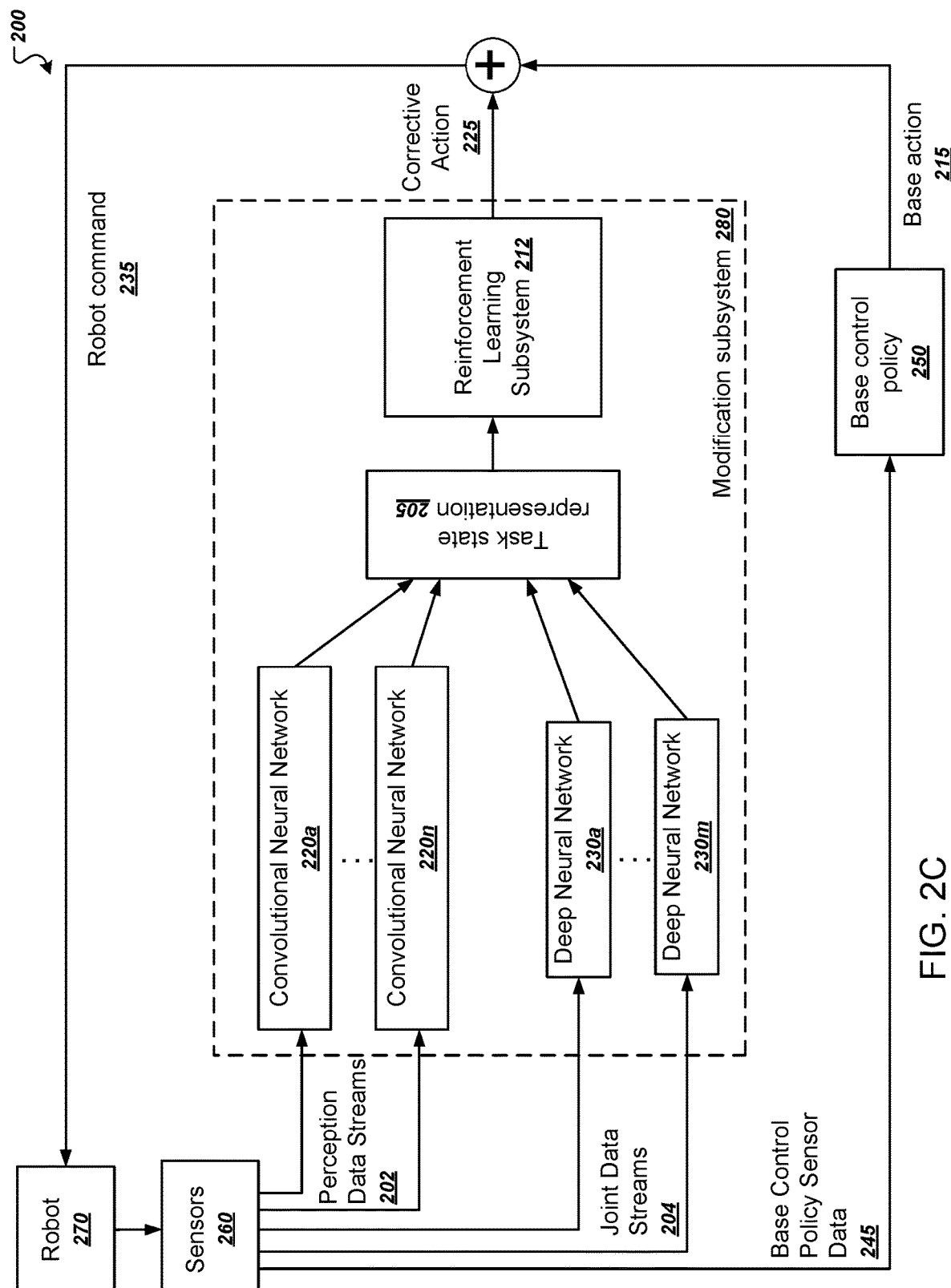
FIG. 2C is a diagram of another example system for executing a subtask using residual reinforcement learning.

FIG. 2C is a diagram of another example system for executing a subtask using residual reinforcement learning. In this example, instead of having a single tuned control policy that generates a robot command, the system uses a residual reinforcement learning subsystem 212 to generate a corrective action 225 that modifies a base action 215 generated by the base control policy 250.

In this example, the base control policy 250 takes as input sensor data 245 from one or more sensors 260 and generates a base action 215. As described above, the output of the base control policy 250 can be one or more commands that are consumed by respective components of the robot 270.

During execution, the reinforcement learning subsystem 212 generates, from the input task state representation 205, a corrective action 225 to be combined with the base action 215. The corrective action 225 is corrective in the sense that it modifies a bse action 215 from the base control policy 250. The resulting robot command 235 can then be executed by the robot 270.

Traditional reinforcement learning processes have used two stages: (1) an acting stage in which the system generates new candidate actions and (2) a training stage where the weights of the model are adjusted to maximize the cumulative reward of each candidate action. As described in the Background section above, traditional approaches to using reinforcement learning for robotics suffer from a severe sparse reward problem, meaning that actions that are randomly generated during the acting stage are extremely unlikely to earn any type of reward by a reward function for the task.

But unlike traditional reinforcement learning, using local demonstration data can provide all information about which action to select during the acting stage. In other words, the local demonstration data can provide a sequence of actions, and thus, the actions do not need to be generated randomly. This technique greatly constrains the problem space and makes convergence of the models much faster.

During training, local demonstration data is used to drive the robot 270. In other words, the robot command 235 generated from the corrective action 225 and the base action 215 need to be used to drive the robot 270. At each time step, the reinforcement learning subsystem 210 receives a representation of a demonstrated action that was used to physically move the robot 270. The reinforcement learning subsystem 210 also receives a base action 215 generated by the base control policy 250.

The reinforcement learning subsystem 210 can then generate a reconstructed corrective action by comparing the demonstrated action to the base action 215. The reinforcement learning subsystem 210 can also use a reward function to generate an actual reward value for the reconstructed corrective action.

The reinforcement learning subsystem 210 can also generate a predicted corrective action generated by the current state of the reinforcement learning model as well as a predicted reward value that would have been generated by using the predicted corrective action. The predicted corrective action is the corrective action that would have been generated by the reinforcement learning subsystem 210 for the current task state representation 205.

The reinforcement learning subsystem 210 can then use the predicted corrective action, the predicted reward value, the reconstructed corrective action, and the actual reward value to compute weight updates for the reinforcement model. Over the iterations of training data, the weight updates serve to adjust the predicted corrective action toward the reconstructed corrective action reflected by the demonstration actions. The reinforcement learning subsystem 210 can compute the weight updates according to any appropriate reward maximization procedure.

One capability afforded by the architectures illustrated in FIGS. 2A-C is the ability to combine multiple different models for sensor streams having different update rates. Some real-time robots have very tight control-loop requirements, and therefore, they can be equipped with force and torque sensors that generate high-frequency updates, e.g., at 100, 1000, or 10,000 Hz. In contrast, few cameras or depth cameras operate at more than 60 Hz.

The architecture illustrated in FIGS. 2A-C having multiple parallel and independent sensor streams, and, optionally, multiple different control policies, allows these different data rates to be combined.

Figure 3A:
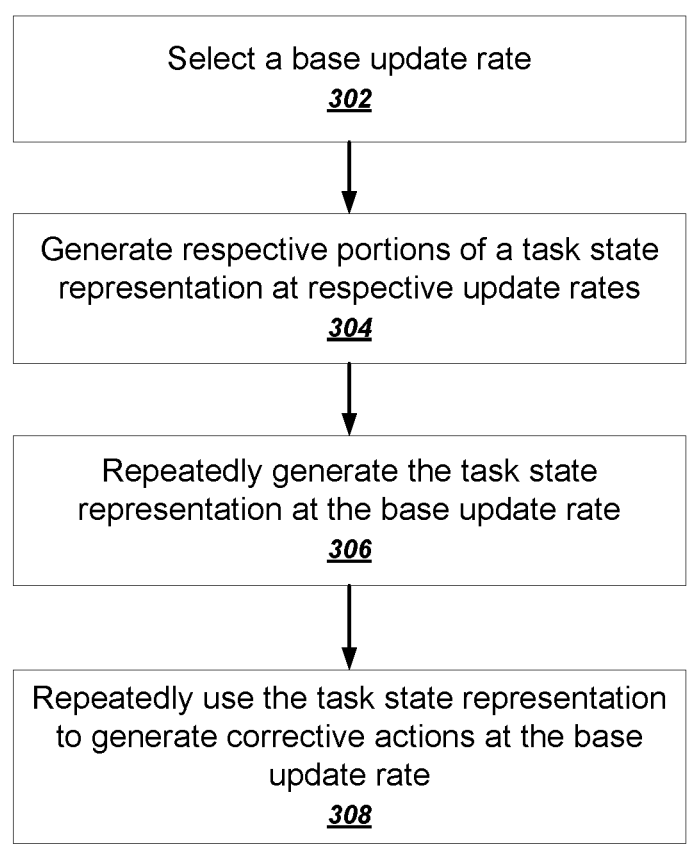
FIG. 3A is a flow chart of an example process for combining sensor data from multiple different sensor streams.

FIG. 3A is a flow chart of an example process for combining sensor data from multiple different sensor streams. The process can be performed by a computer system having one or more computers in one or more locations, e.g., the system 100 of FIG. 1. The process will be described as being performed by a system of one or more computers.

The system selects a base update rate (302). The base update rate will dictate the rate at which a learning subsystem, e.g. the tuned control policy 210, will generate commands to drive a robot. In some implementations, the system selects the base update rate based on a minimum real-time update rate of the robot. Alternatively, the system can select the base update rate based on a sensor that generates data at the fastest rate.

The system generates respective portions of a task state representation at respective update rates (304). Because the neural network subsystems can operate independently and in parallel, the neural network subsystems can repeatedly generate respective portions of the task state representation at a rate dictated by the rate of their respective sensors.

In order to enhance the independent and parallel nature of the system, in some implementations, the system maintains multiple separate memory devices or memory partitions into which the different portions of the task state representation will be written. This can prevent the different neural network subsystems from competing for memory access while generating their outputs at high frequency.

The system repeatedly generates the task state representation at the base update rate (306). During each time period defined by the base update rate, the system can generate a new version of the task state representation by reading from most recently updated sensor data output by the plurality of neural network subsystems. For example, the system can read from multiple separate memory devices or memory partitions to generate a complete task state representation. Notably, this means that the data generated by some neural network subsystems is generated at a different rate than it is consumed. For example, for sensors having slower update rates, the data can be consumed at a much faster rate than it is generated.

The system repeatedly uses the task state representations to generate commands for the robot at the base update rate (308). By using independent and parallel neural network subsystems, the system can ensure that the commands are generated at a sufficiently fast update rate in order to power even robots having hard real-time constraints.

This arrangement also means that the system can simultaneously feed multiple independent control algorithms having different update frequencies. For example, as described above with respect to FIG. 2B, rather than the system generating a single command, the system can include multiple independent control policies that each generate a sub-command. The system can then generate a final command by combining the subcommands into a final, hybrid robot command that represents the output of multiple different control algorithms.

For example, a visual control algorithm can cause a robot to move faster toward a recognized object. Meanwhile, a force control algorithm can cause a robot to track along a surface that it has made contact with. Even though the visual control algorithm is typically updated at a much slower rate than the force control algorithm, the system can still power both simultaneously at the base update rate using the architecture depicted in FIGS. 2A-C.

The architecture illustrated in FIGS. 2A-C provides many opportunities for extending the capabilities of the system without major reengineering. The multiple parallel and independent data streams allow for implementing machine-learning functions that are advantageous for local demonstration learning.

For example, to more thoroughly adapt a robot to perform in a particular environment, it can be highly advantageous to integrate sensors that take into account local environmental data.

One example of using local environmental data is a function that considers electrical connectivity. Electrical connectivity can be useful as a reward factor for a variety of challenging robotics tasks that involve establishing an electrical current between two components. These tasks include inserting cables into jacks, inserting power plugs into power sockets, and screwing in lightbulbs, to name just a few examples.

To integrate electrical connectivity into the modification subsystem 280, an electrical sensor, which for example can be one of the sensors 260, can be configured in the workcell to detect when an electrical current has been established. The output of the electrical sensor can then be processed by a separate neural network subsystem and the result can be added to the task state representation 205. Alternatively, the output of the electrical sensor can be provided directly as input to a system implementing the tuned control policy or a reinforcement learning subsystem.

Another example of using local environmental data is a function that considers certain types of audio data. For example, many connector insertion tasks have very distinctive sounds when the task is completed successfully. Thus, the system can use a microphone to capture audio and an audio processing neural network whose output can be added to the task state representation. The system can then use a function that takes into consideration particular acoustic characteristics of the sound of a connector insertion, which forces the learning subsystem to learn what a successful connector insertion sounds like.

Figure 3B:
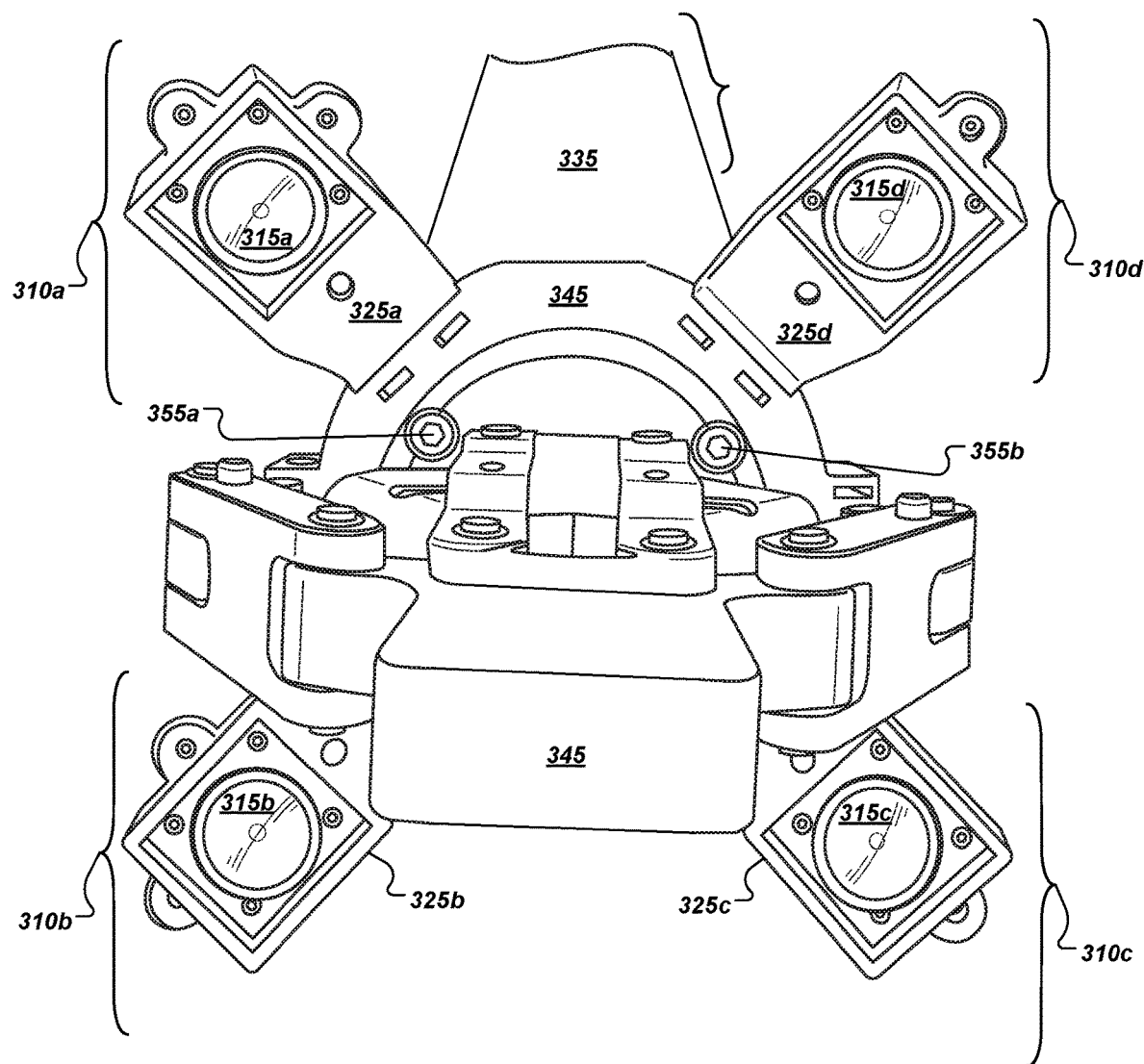
FIG. 3B is a diagram of a camera wristband.

FIG. 3B is a diagram of a camera wristband. The camera wristband is an example of the type of rich instrumentation that can be used to perform high-precision demonstration learning with the architecture described above. FIG. 3B is a perspective view in which the tool at the end of the robot arm is closest to the viewer.

In this example, the camera wristband is mounted onto a robot arm 335 just before a tool 345 that is situated at the very end of the robot arm 335. The camera wristband is mounted onto the robot arm 335 with a collar 345 and has four radially mounted cameras 310a-d.

The collar 345 can have any appropriate convex shape that allows the collar 345 to be securely mounted to the end of a robot arm. The collar 345 can be designed to be added to a robot built by a third-party manufacturer. For example, a system that distributes skill templates can also distribute camera wristbands in order to aid non-expert users in getting models to converge quickly. Alternatively or in addition, the collar 345 can be integrated into the robot arm during the manufacturing process by the manufacturer.

The collar 345 can have an ellipsoidal shape, e.g., circular or ovular, or a rectangular shape. The collar 345 can be formed from a single solid volume that is fastened to the end of the robot arm before the tool 345 is fastened. Or the collar 345 can be opened and securely closed by a fastening mechanism, e.g., a clasp or a latch. The collar 345 can be constructed out of any appropriate material that provides for a secure connection to the robot arm, e.g., hard plastic; fiberglass; fabric; or metal, e.g., aluminum or steel.

Each camera 310a-d has a respective mount 325a-d that secures a sensor, other electronics, and a respective lens 315a-d to the collar 345. The collar 345 can also include one or more lights 355a-b for illuminating the volume captured by the cameras 310a-d. In general, the cameras 310a-d are arranged to capture different respective views of the tool 345 or of a working volume just beyond the tool 345.

The example camera wristband has four radially mounted cameras, but any appropriate number of cameras can be used, e.g., 2, 5, or 10 cameras. As described above, the architecture of the modification subsystem 280 allows for any arbitrary number of sensor streams to be included into the task state representation. For example, a computer system associated with the robot can implement a different respective convolutional neural network to process the sensor data generated by each of the cameras 310a-d in parallel. The processed camera outputs can then be combined to generate the task state representation, which as described above can be used to power multiple control algorithms running at different frequencies. As described above, the processed camera outputs can be combined with outputs from other networks that independently process the outputs of force sensors, a torque sensors, position sensors, velocity sensors, or tactile sensors, or any appropriate combination of these sensors.

In general, using the camera wristband in the demonstration learning process results in faster convergence of the models because the system will be able to recognize reward conditions in many more positions and orientations. Thus, using the camera wristband has the effective further reducing the amount of training time required to adapt a base control policy with local demonstration data.

Figure 3C:
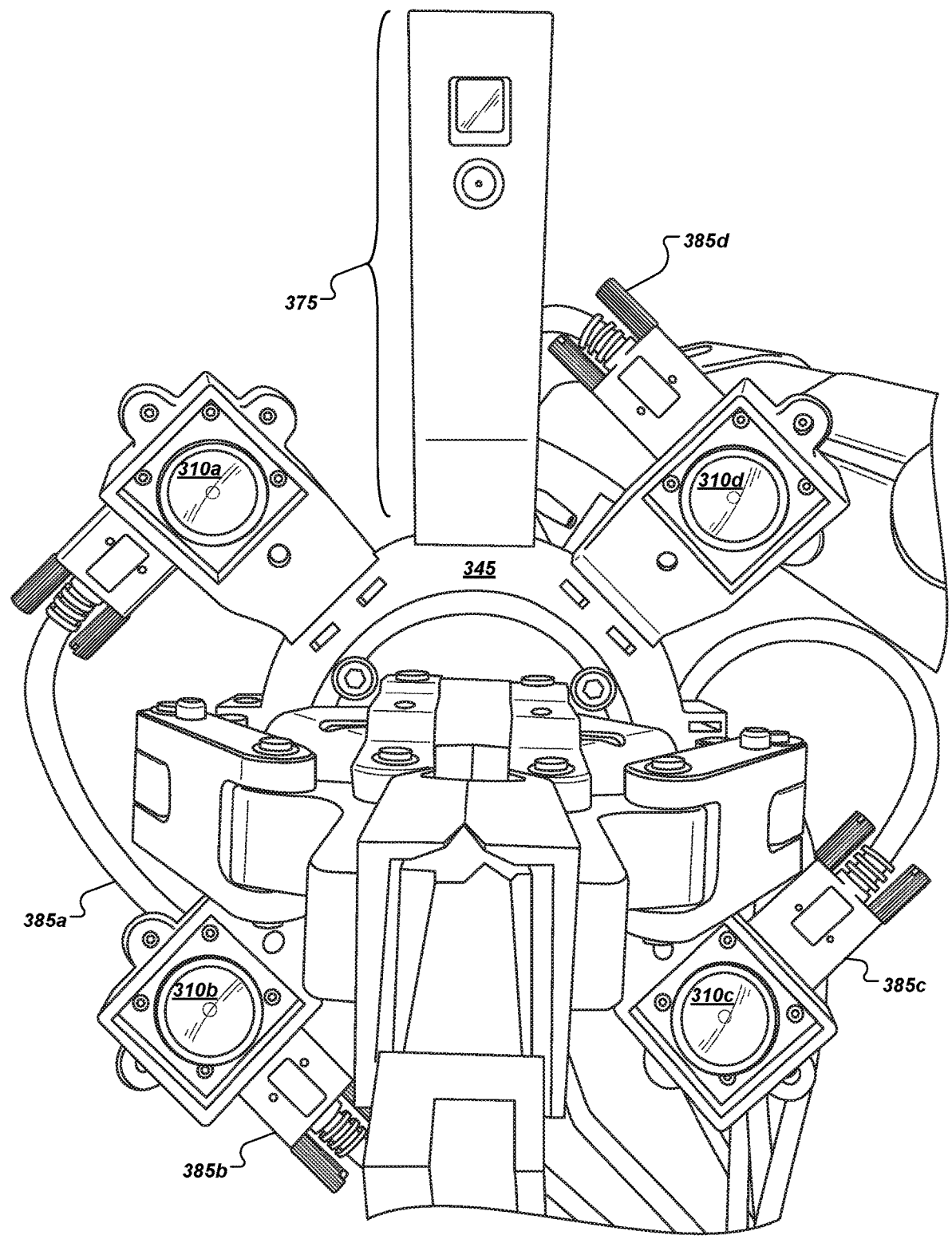
FIG. 3C is another example view of a camera wristband.

FIG. 3C is another example view of a camera wristband. FIG. 3C illustrates further instrumentation that can be used to implement the camera wristband, including cabling 385a-d that can be used to feed the outputs of the cameras to respective convolutional neural networks. FIG. 3C also illustrates how an additional depth camera 375 can also be mounted onto the collar 345. As described above, the architecture of the system allows any other sensors to be integrated into the perception system, thus, for example, a separately trained convolutional neural network can process the outputs of the depth camera 375 to generate another portion of the task state representation.

Figure 3D:
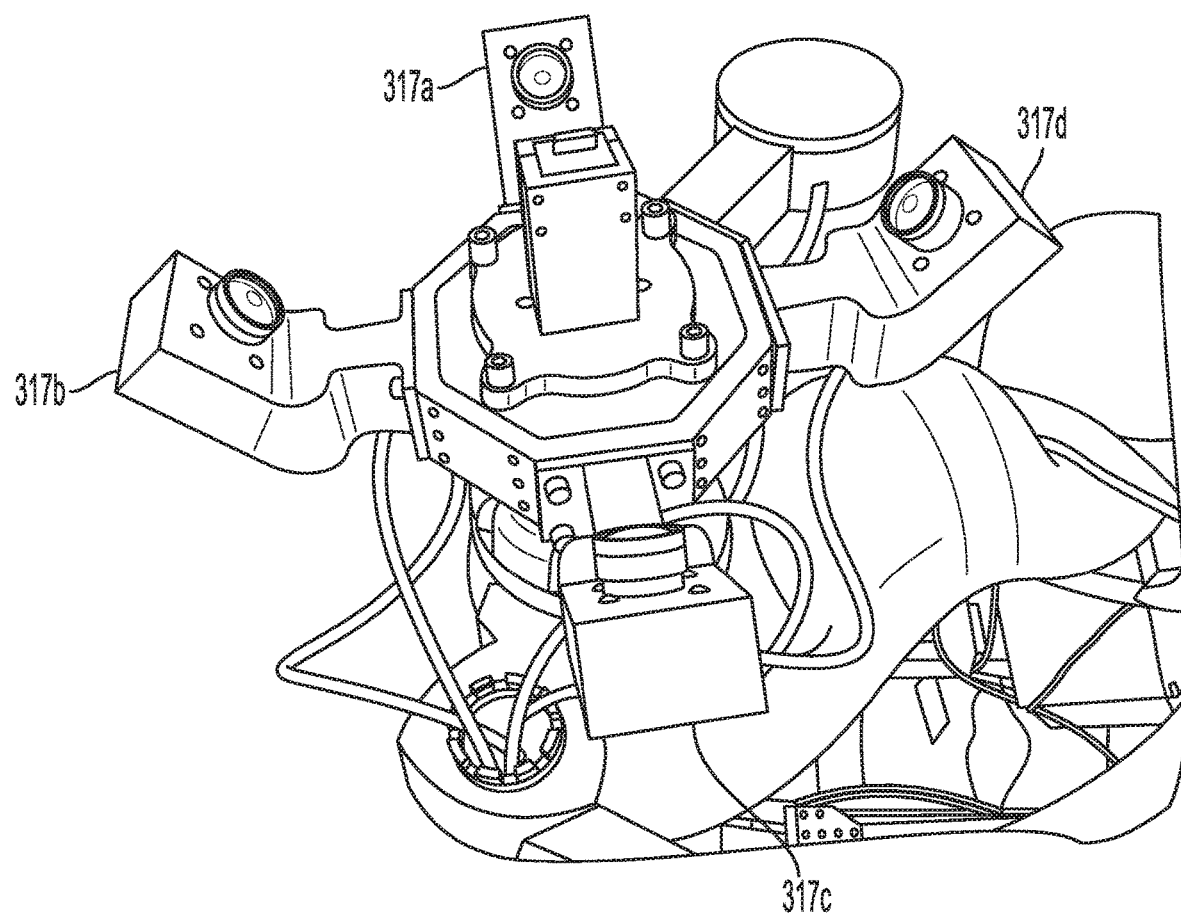
FIG. 3D is another example view of a camera wristband.

FIG. 3D is another example view of a camera wristband. FIG. 3D is a perspective view of a camera wristband having a metal collar and four radially mounted cameras 317a-d.

With these basic mechanisms for using local demonstration data to refine control policies, users can compose tasks to build hardware-agnostic skill templates, which can be downloaded and used to rapidly deploy a task on many different kinds of robots and in many different kinds of environments.

Figure 4:
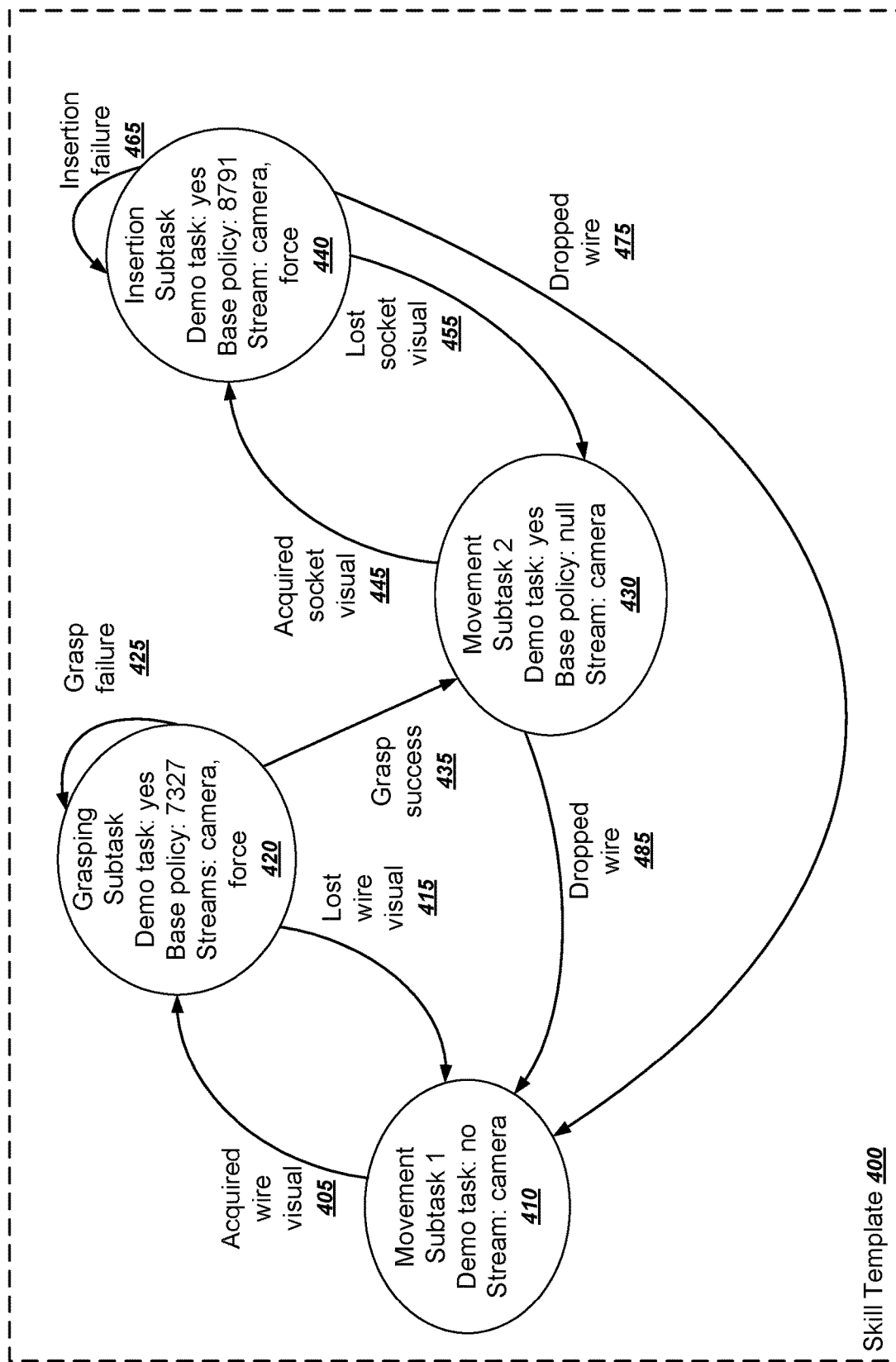
FIG. 4 illustrates an example skill template.

FIG. 4 illustrates an example skill template 400. In general, a skill template defines a state machine for a plurality of subtasks that are required to perform a task. Notably, the skill templates are hierarchically composable, meaning that each subtask can be a standalone task or another skill template.

Each subtask of a skill template has a subtask id and includes subtask metadata, including whether the subtask is a demonstration subtask or a nondemonstration subtask, or whether the subtask refers to another skill template that should be separately trained. The subtask metadata can also indicate which sensor streams will be used to perform the subtask. Subtasks that are demonstration subtasks will additionally include a base policy id that identifies a base policy that will be combined with the corrective actions learning through learning from local demonstration data. Each demonstration subtask will also be explicitly or implicity associated with one or more software modules that control the training process for the subtask.

Each subtask of a skill template also has one or more transition conditions that specify the conditions under which a transition to another task in the skill template should be made. The transition conditions may also be referred to as subtask goals of the subtask.

The example in FIG. 4 illustrates a skill template for performing a task that has been notoriously difficult to achieve with traditional robotic learning techniques. The task is a grasp and connection insertion task, which requires a robot to find a wire in a workcell and insert a connector on one end of the wire into a socket that is also in the workcell. This problem is difficult to generalize with traditional reinforcement learning techniques because wires come in many different textures, diameters, and colors. In addition, if the grasping subtask of the skill is not successful, traditional reinforcement learning techniques fail to inform the robot what to do next or how it can make progress.

The skill template 400 includes four subtasks that are represented in FIG. 4 as nodes of a graph that defines a state machine. In practice, all the information in FIG. 4 could be represented in any appropriate format, e.g., as a purely text configuration file or records in a relational database. Alternatively or in addition, a user interface device can generate a graphical skill template editor that allows a user to define a skill template through a graphical user interface.

The first subtask in the skill template 400 is a movement subtask 410. The movement subtask 410 is designed to locate a wire in the workcell, which requires moving a robot from an initial position to an expected location of the wire, e.g., as placed by a previous robot in an assembly line. Moving from one location to the next is typically not very dependent on the local characteristics of the robot, and thus the metadata of the movement subtask 410 specifies that the subtask is a nondemonstration subtask. The metadata of the movement subtask 410 also specifies that the camera stream is needed in order to locate the wire. The movement subtask 410 also specifies an "acquired wire visual" transition condition 405, which indicates when the robot should transition to the next subtask in the skill template.

The next subtask in the skill template 400 is a grasping subtask 420. The grasping subtask 420 is designed to grasp a wire in the workcell. This subtask is highly dependent on the characteristics of the wire and the characteristics of the robot, particularly the tool being used to grasp the wire. Therefore, the grasping subtask 420 is specified as a demonstration subtask that requires refinement with local demonstration data. The grasping subtask 420 is thus also associated with a base policy id that identifies a previously generated base control policy for grasping wires generally.

The grasping subtask 420 also specifies that both camera streams and force sensor streams are required to perform the subtask.

The grasping subtask 420 also includes three transition conditions. The first transition condition, the "lost wire visual" transition condition 415, is triggered when the robot loses visual contact with the wire. This can happen, for example, when the wire is unexpectedly moved in the workcell, e.g., by a human or another robot. In that case, the robot transitions back to the movement subtask 410.

The second transition condition of the grasping subtask 420, the "grasp failure" transition condition 425, is triggered when the robot attempts to grasp the wire but fails. In that scenario, the robot can simply loop back and try the grasping subtask 420 again.

The third transition condition of the grasping subtask 420, the "grasp success" transition condition 435, is triggered when the robot attempts to grasp the wire and succeeds.

A demonstration subtask can also indicate which transition conditions require local demonstration data. For example, a particular subtask can indicate that local demonstration data is needed for all three transition conditions. Thus, a user can demonstrate how a grasp succeeds, demonstrate a failed grasp, and demonstrate a robot losing a visual on the wire. The next subtask in the skill template 400 is a second movement subtask 430. The movement subtask 430 is designed to move the grasped wire to a location in the workcell that is near the socket. In many connection and insertion situations that users would like robots to be able to perform, the socket is in a highly constrained space, e.g., inside of a dishwasher, a television, or a microwave under assembly. Because moving in that highly constrained space is highly dependent on the subtask and the workcell, the second movement task 430 is specified as a demonstration subtask, even though it only involves moving from one location in the workcell to another. Thus, movement subtasks can be either demonstration subtasks or nondemonstration subtasks, depending on the requirements of the skill.

Although the second movement subtask 430 is indicated to be a demonstration subtask, the second movement subtask 430 does not specify any base policy id. This is because some subtasks are so highly dependent on the local workcell that including a base policy would only hamper convergence of the models. For example, if the second movement task 430 requires moving the robot in a very particular orientation inside of an appliance, a generalized base policy for moving would not be helpful. Thus, a user can perform a refinement process to generate local demonstration data, which demonstrates how the robot should move through the workcell in order to attain the particular orientation inside of the appliance.

The second movement subtask 430 includes two transition conditions 445 and 485. The first "acquired socket visual" transition condition 445 is triggered when a camera stream makes visual contact with the socket.

The second "dropped wire" transition condition 485 is triggered if the robot should happen to drop the wire while moving toward the socket. In that case, the skill template 400 specifies that the robot would need to go back to movement subtask 1 in order to start the skill over again. These kind of transition conditions within the skill template provides a level of built-in robustness and dynamic reaction for robots that traditional reinforcement learning techniques simply cannot provide.

The last subtask in the skill template 400 is an insertion subtask 440. The insertion subtask 440 is designed to insert the connector of a grasped wire into a socket. The insertion subtask 440 is highly dependent on the type of wire and the type of socket, and thus, the skill template 400 indicates that the insertion subtask 440 is a demonstration subtask that is associated with base policy id that relates to insertion subtasks generally. The insertion subtask 440 also indicates that the subtask requires both camera streams and force sensor streams.

The insertion subtask 440 includes three transition conditions. A first "insertion failure" transition condition 465 is triggered when insertion fails for any reason and specifies trying the insertion again. A second "lost socket visual" transition condition 455 is triggered when the socket should happen to move out of sight of the camera and specifies again moving the wire within the highly constrained space to the location of the socket. And lastly, a "dropped wire" transition condition 475 is triggered when the wire is dropped while performing the insertion task. In that case, the skill template 400 specifies going all the way back to the first movement subtask 410.

One of the major advantages of the skill template illustrated in FIG. 4 is its composability by developers. This means that new skill templates can be composed from already developed subtasks. This functionality is also includes hierarchical composability, which means that each subtask within a particular skill template can reference another skill template.

For example, in an alternative implementation, the insertion subtask 440 can actually reference an insertion skill template that defines a state machine of multiple finely controlled movements. For example, the insertion skill template can include a first movement subtask with a goal of as precisely as possible aligning a connector with a socket, a second movement subtask with a goal of subachieving contact between the connector and a side of the socket, and a third movement subtask with a goal of achieving a full connection by using the side of the socket as a force guide.

And still further skill templates can be hierarchically composed from the skill template 400. For example, the skill template 400 can be one small piece of a more complex set of subtasks required to assemble an electronic appliance. The overall skill template can have multiple connector insertion subtasks that each reference a skill template for achieving the subtask, e.g., the skill template 400.

Figure 5:
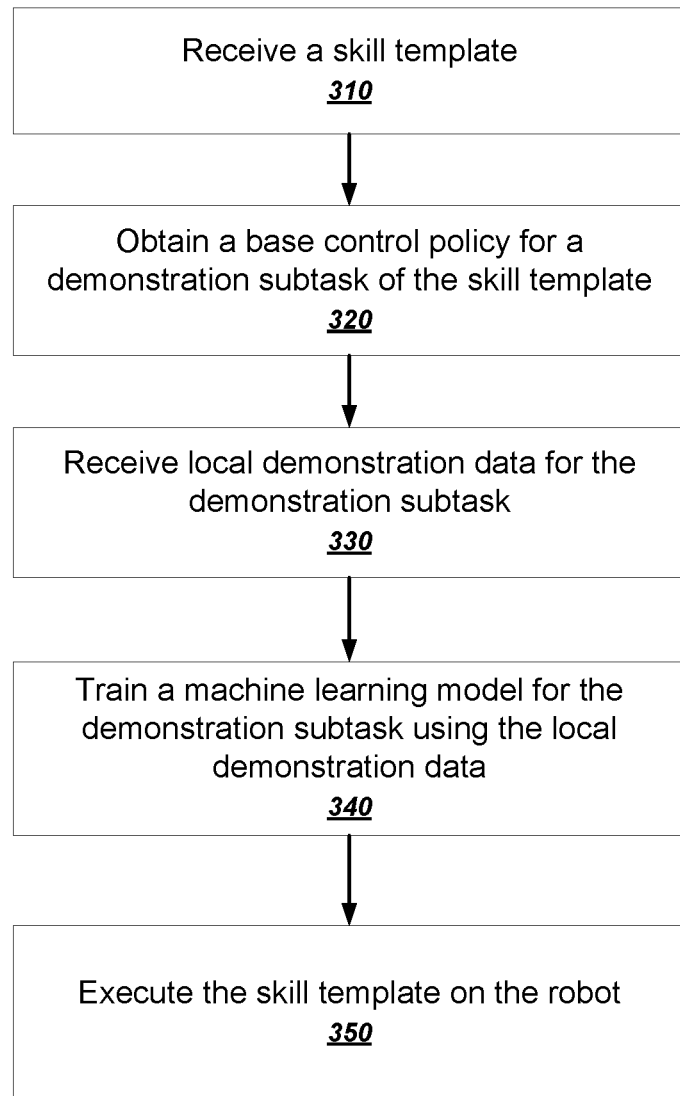
FIG. 5 is a flowchart of an example process for configuring a robot to perform a skill using a skill template.

FIG. 5 is a flowchart of an example process for configuring a robot to perform a skill using a skill template. The process can be performed by a computer system having one or more computers in one or more locations, e.g., the system 100 of FIG. 1. The process will be described as being performed by a system of one or more computers.

The system receives a skill template (510). As described above, the skill template defines a state machine having a plurality of subtasks as well as transition conditions that define when a robot should transition from performing one task to the next. In addition, the skill template can define which of the tasks are demonstration subtasks that require refinement using local demonstration data.

The system obtains a base control policy for a demonstration subtask of the skill template (520). The base control policy can be a generalized control policy that is generated from multiple different robot models.

The system receives local demonstration data for the demonstration subtask (530). A user can use an input device or user interface to cause a robot to perform the demonstration subtask over multiple iterations. During this process, the system automatically generates local demonstration data for performing the subtask.

The system trains a machine learning model for the demonstration subtask (540). As described above, the machine learning model can be configured to generate, for one or more input sensor streams, a command to be executed by the robot, and the machine learning model can be tuned using local demonstration data. In some implementations, the machine learning model is a residual reinforcement learning model that generates a corrective action to be combined with a base action generated by the base control policy.

The system executes the skill template on the robot (550). After training all demonstration subtasks, the system can use the skill template to cause the robot to fully perform the task. During this process, the robot will use refined demonstration subtasks that are tailored specifically for the robot's hardware and working environment using local demonstration data.

Figure 6A:
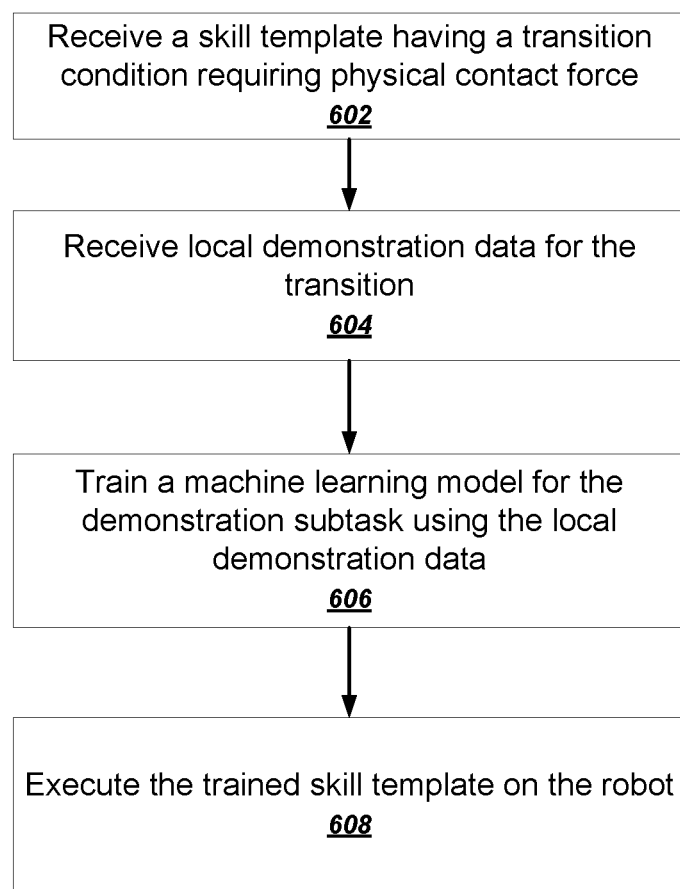
FIG. 6A is a flowchart of an example process for using a skill template for a task that uses force as a guide.

FIG. 6A is a flowchart of an example process for using a skill template for a task that uses force as a guide. The skill template arrangement described above provides for a relatively easy way to generate very sophisticated tasks that are composed of multiple, highly complex subtasks. One example of such a task in a connector insertion task that uses a task which considers force data as a guide. This allows a robot to achieve much higher precision than it would otherwise be capable of achieving. The process can be performed by a computer system having one or more computers in one or more locations, e.g., the system 100 of FIG. 1. The process will be described as being performed by a system of one or more computers.

The system receives a skill template having a transition condition that requires establishment of physical contact force between an object held by a robot and a surface in the robot's environment (602). As described above, a skill template can define a state machine having a plurality of tasks. The transition condition can define a transition between a first subtask and a second subtask of the state machine.

For example, the first subtask can be movement subtask and a second subtask can be an insertion subtask. The transition condition can specify that a connector held by a robot and to be inserted into a socket needs to make physical contact force with an edge of the socket.

The system receives local demonstration data for the transition (604). In other words, the system can require the user to demonstrate the transition between the first subtask and the second subtask. The system can also require the user to demonstrate failure scenarios. One such failure scenario can be losing physical contact force with the edge of the socket. If that occurs, the skill template can specify returning back to the first movement subtask of the template so that the robot can reestablish physical contact force as specified by the transition condition.

The system trains a machine learning model using the local demonstration data (606). As described above, through training, the system learns to avoid actions that result in the loss of physical contact force and learns to choose actions that are likely to maintain the physical contact force throughout the second task.

The system executes the trained skill template on the robot (608). This causes the robot to automatically perform the subtasks and transitions defined by the skill template. For connection and insertion tasks, for example, the local demonstration data can cause the robot to be highly adapted to inserting one particular kind of connector.

Figure 6B:
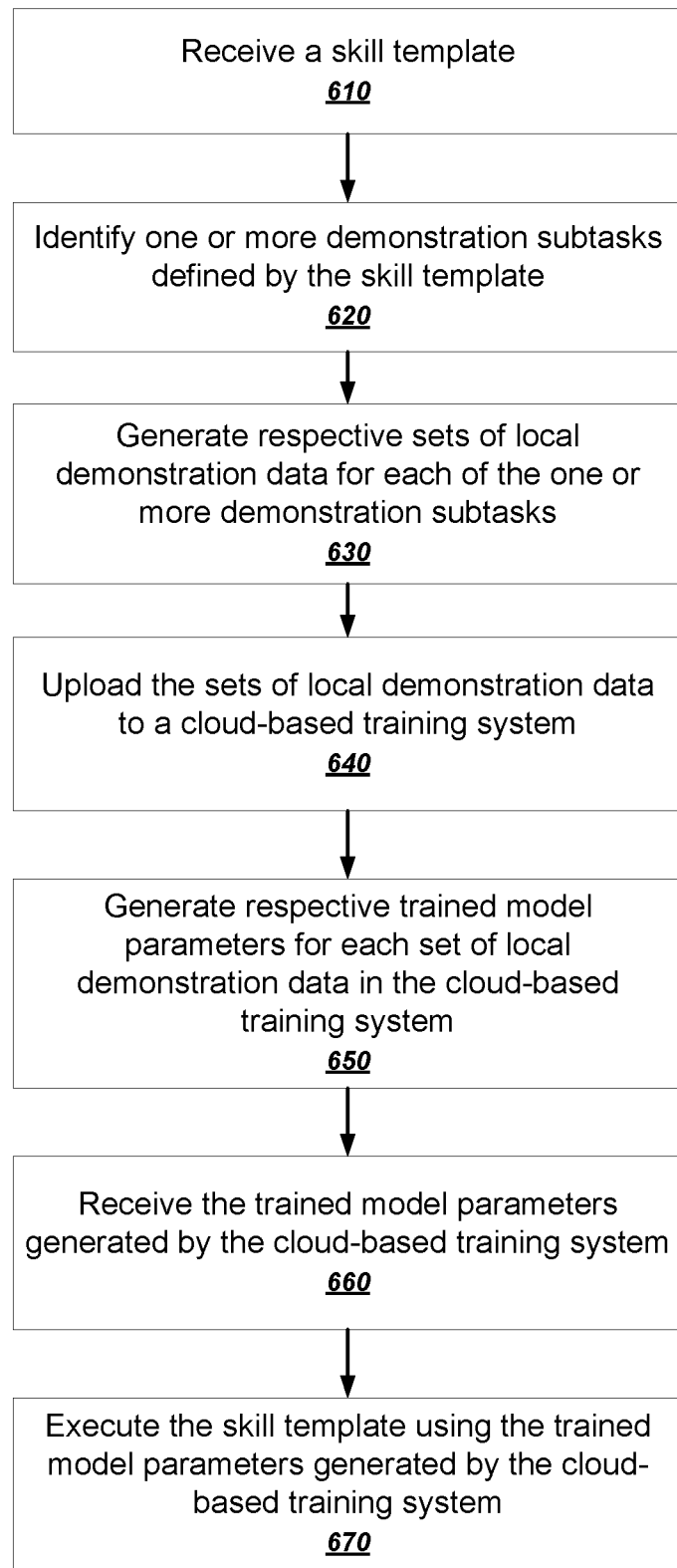
FIG. 6B is a flowchart of an example process for training a skill template using a cloud-based training system Like reference numbers and designations in the various drawings indicate like elements.

FIG. 6B is a flowchart of an example process for training a skill template using a cloud-based training system. In general, a system can generate all demonstration data locally and then upload the demonstration data to a cloud-based training system to train all the demonstration subtasks of a skill template. The process can be performed by a computer system having one or more computers in one or more locations, e.g., the system 100 of FIG. 1. The process will be described as being performed by a system of one or more computers.

The system receives a skill template (610). For example, an online execution system can download the skill template from a cloud-based training system that will train the demonstration subtasks of the skill template or from another computer system.

The system identifies one or more demonstration subtasks defined by the skill template (620). As described above, each subtask defined in the skill template can be associated with metadata that indicates whether the subtask is a demonstration subtask or a nondemonstration subtask.

The system generates respective sets of local demonstration data for each of the one or more demonstration subtasks (630). As described above, the system can instantiate and deploy separate task systems that each generate local demonstration data while a user is manipulating a robot to perform the subtask in the local workcell. The task state representations can be generated at a base rate of the subtask, regardless of what the update rate is for the sensors that contribute data to the task state representation. This provides a convenient way to store and organize the local demonstration data, rather than generating many different sets of sensor data that have to all be somehow reconciled later on.

The system uploads the sets of local demonstration data to a cloud-based training system (640). Most facilities that employ robots for real-world tasks do not have onsite datacenters that would be suitable for training sophisticated machine-learning models. Thus, while the local demonstration data can be collected on-site by a system that is co-located with the robot that will perform the task, the actual model parameters can be generated by a cloud-based training system that is accessible only over the Internet or another computer network.

As described above, the size of the local demonstration data is expected to be orders of magnitude smaller than the size of data that is used to train the base control policies. Thus, although the local demonstration data may be large, the upload burden is manageable in a reasonable amount of time, e.g., a few minutes to an hour of uploading time.

The cloud-based training system generates respective trained model parameters for each set of local demonstration data (650). As described above, the training system can train a learning system to generate robot commands, which can be, e.g., composed from corrective actions that correct base actions generated by a base control policy. As part of this process, the training system can obtain a respective base control policy for each demonstration subtask, either locally or from another computer system, which can be a third-party computer system that publishes the task or skill template.

The cloud-based training system typically will have much more computing power than an online execution system. Thus, while there is a large computational burden involved in training each demonstration subtask, these operations can be massively parallelized on the cloud-based training system. Therefore, in a typical scenario, the time required to train a skill template from local demonstration data on a cloud-based training system is no more than a few hours.

The system receives the trained model parameters generated by the cloud-based training system (660). The size of the trained model parameters is typically much smaller than the size of the local demonstration data for a particular subtask, thus, after the models are trained, downloading the trained parameters takes a negligible amount of time.

The system executes the skill template using the trained model parameters generated by the cloud-based training system (670). As part of this process, the system can also download the base control policies for the demonstration subtasks, e.g., from the training system, from their original source, or from another source. The trained model parameters can then be used to generate commands for the robot to execute. In a reinforcement learning system for a demonstration subtask, the parameters can be used to generate corrective actions that modify base actions generated by the base control policies. The online execution system can then repeatedly issue the resulting robot commands to drive the robot to perform the particular task.

The process described in FIG. 6B can be performed by a one-person team in the course of a single day to get a robot to perform highly precise skills in a way that is tailored to its environment. This is a vast improvement over traditional methods of manual programming or even traditional methods of reinforcement learning, which require teams of many engineers to work for many weeks or months designing, testing, and training models that do not generalize well to other scenarios.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

In this specification, a motion swept volume is a region of the space that is occupied by a least a portion of a robot or tool during the entire execution of a motion plan. The motion swept volume can be generated by collision geometry associated with the robot-tool system.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the onsite execution engine 150 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving, by an online execution system configured to control a robot, a skill template to be trained to cause the robot to perform a particular skill having a plurality of subtasks;
  identifying one or more demonstration subtasks defined by the skill template, wherein each demonstration subtask is an action to be refined using local demonstration data;
  generating, by the online execution system, respective sets of local demonstration data for each of the one or more demonstration subtasks;
  uploading, by the online execution system to a cloud-based training system, the sets of local demonstration data;
  generating, by the cloud-based training system, respective trained model parameters for each set of local demonstration data;
  receiving, by the online execution system, the trained model parameters generated by the cloud-based training system; and
  executing the skill template using the trained model parameters generated by the cloud-based training system.

Embodiment 2 is the method of embodiment 1, wherein generating the respective sets of local demonstration data comprises generating task state representations for each of a plurality of points in time.

Embodiment 3 is the method of embodiment 2, wherein the task state representations each represent an output generated by a respective sensor that observes the robot.

Embodiment 4 is the method of any one of embodiments 1-3, wherein the online execution system and the robot are located in a same facility, and wherein the cloud-based training system is accessible only over the Internet.

Embodiment 5 is the method of any one of embodiments 1-4, further comprising:
  receiving, by the online execution system from the cloud-based training system, a base control policy for each of the one or more demonstration subtasks.

Embodiment 6 is the method of embodiment 5, wherein executing the skill template comprises generating, by the online execution system, a corrective action using the trained model parameters generated by the cloud-based training system.

Embodiment 7 is the method of embodiment 6, further comprising adding the corrective action to a base action generated by the based control policy received from the cloud-based training system.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   receiving, from a cloud-based training system by an online execution system configured to control a robot, a skill template to be trained to cause the robot to perform a particular skill having a plurality of subtasks;
   identifying, by the online execution system, one or more demonstration subtasks defined by the skill template, wherein each demonstration subtask is an action to be refined using local demonstration data;
   generating, by the online execution system, respective sets of local demonstration data for each of the one or more demonstration subtasks;
   uploading, by the online execution system to the cloud-based training system, the sets of local demonstration data;
   generating, by the cloud-based training system, respective trained model parameters for each set of local demonstration data, wherein the cloud-based training system comprises more computational capability than the online execution system;
   receiving, by the online execution system, from the cloud-based training system, the trained model parameters generated by the cloud-based training system; and
   executing, by the online execution system, the skill template using the trained model parameters generated by the cloud-based training system.

2. The method of claim 1, wherein generating the respective sets of local demonstration data comprises generating task state representations for each of a plurality of points in time.

3. The method of claim 2, wherein the task state representations each represent an output generated by a respective sensor that observes the robot.

4. The method of claim 1, wherein the online execution system and the robot are located in a same facility, and wherein the cloud-based training system is accessible only over the Internet.

5. The method of claim 1, further comprising:
   receiving, by the online execution system from the cloud-based training system, a base control policy for each of the one or more demonstration subtasks.

6. The method of claim 5, wherein executing the skill template comprises generating, by the online execution system, a corrective action using the trained model parameters generated by the cloud-based training system.

7. The method of claim 6, further comprising adding the corrective action to a base action generated by the based control policy received from the cloud-based training system.

8. The system of claim 5, wherein the base control policy is generated from system demonstration data generated on one or more different second robots at one or more facilities remote from a first robot.

9. The system of claim 1, wherein the skill template can be adapted for multiple different robot types.

10. The system of claim 1, wherein the cloud-based training system is a distributed system comprising one or more nodes.

11. A system comprising:
    one or more computers and one or more storage devices storing instructions that are operable, when executed by the one or more computers, to cause the one or more computers to perform operations comprising:
    receiving, from a cloud-based training system by an online execution system configured to control a robot, a skill template to be trained to cause the robot to perform a particular skill having a plurality of subtasks;
    identifying, by the online execution system, one or more demonstration subtasks defined by the skill template, wherein each demonstration subtask is an action to be refined using local demonstration data;
    generating, by the online execution system, respective sets of local demonstration data for each of the one or more demonstration subtasks;

uploading, by the online execution system to the cloud-based training system, the sets of local demonstration data;

generating, by the cloud-based training system, respective trained model parameters for each set of local demonstration data, wherein the cloud-based training system comprises more computational capability than the online execution system;

receiving, by the online execution system, from the cloud-based training system, the trained model parameters generated by the cloud-based training system; and executing, by the online execution system, the skill template using the trained model parameters generated by the cloud-based training system.

12. The system of claim 11, wherein generating the respective sets of local demonstration data comprises generating task state representations for each of a plurality of points in time.

13. The system of claim 12, wherein the task state representations each represent an output generated by a respective sensor that observes the robot.

14. The system of claim 11, wherein the online execution system and the robot are located in a same facility, and wherein the cloud-based training system is accessible only over the Internet.

15. The system of claim 11, wherein the operations further comprise:

receiving, by the online execution system from the cloud-based training system, a base control policy for each of the one or more demonstration subtasks.

16. The system of claim 15, wherein executing the skill template comprises generating, by the online execution system, a corrective action using the trained model parameters generated by the cloud-based training system.

17. The system of claim 16, further comprising adding the corrective action to a base action generated by the based control policy received from the cloud-based training system.

18. One or more non-transitory computer storage media encoded with computer program instructions that when executed by one or more computers cause the one or more computers to perform operations comprising:

receiving, from a cloud-based training system by an online execution system configured to control a robot, a skill template to be trained to cause the robot to perform a particular skill having a plurality of subtasks;

identifying, by the online execution system, one or more demonstration subtasks defined by the skill template, wherein each demonstration subtask is an action to be refined using local demonstration data;

generating, by the online execution system, respective sets of local demonstration data for each of the one or more demonstration subtasks;

uploading, by the online execution system to the cloud-based training system, the sets of local demonstration data;

generating, by the cloud-based training system, respective trained model parameters for each set of local demonstration data, wherein the cloud-based training system comprises more computational capability than the online execution system;

receiving, by the online execution system, from the cloud-based training system, the trained model parameters generated by the cloud-based training system; and executing, by the online execution system, the skill template using the trained model parameters generated by the cloud-based training system.

19. The one or more non-transitory computer storage media of claim 18, wherein generating the respective sets of local demonstration data comprises generating task state representations for each of a plurality of points in time.

20. The one or more non-transitory computer storage media of claim 19, wherein the task state representations each represent an output generated by a respective sensor that observes the robot.

21. The one or more non-transitory computer storage media of claim 18, wherein the online execution system and the robot are located in a same facility, and wherein the cloud-based training system is accessible only over the Internet.

22. The one or more non-transitory computer storage media of claim 18, further comprising:

receiving, by the online execution system from the cloud-based training system, a base control policy for each of the one or more demonstration subtasks.

23. The one or more non-transitory computer storage media of claim 22, wherein executing the skill template comprises generating, by the online execution system, a corrective action using the trained model parameters generated by the cloud-based training system.

* * * * *